(12) United States Patent
Yoshimura

(10) Patent No.: US 8,838,410 B2
(45) Date of Patent: Sep. 16, 2014

(54) COORDINATE INPUT APPARATUS

(75) Inventor: Yuichiro Yoshimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 13/210,268

(22) Filed: Aug. 15, 2011

(65) Prior Publication Data

US 2012/0065929 A1  Mar. 15, 2012

(30) Foreign Application Priority Data

Sep. 13, 2010 (JP) .................... 2010-204865

(51) Int. Cl.
 *G01B 11/03* (2006.01)
 *G06F 3/042* (2006.01)
 *G06F 3/041* (2006.01)

(52) U.S. Cl.
 CPC ............ *G06F 3/0428* (2013.01); *G06F 3/0416* (2013.01); *G06F 3/0421* (2013.01)
 USPC ............ 702/150; 345/173; 345/175; 702/159

(58) Field of Classification Search
 CPC ... G06F 3/0428; G06F 3/0421; G06F 3/0416; G02B 5/124
 USPC ..................... 702/94, 95, 150, 151, 158, 159; 345/173, 177, 178, 179, 175; 178/18.01, 18.04
 See application file for complete search history.

(56) References Cited

U.S. PATENT DOCUMENTS

| | | | |
|---|---|---|---|
| 4,507,557 A | 3/1985 | Tsikos | |
| 4,886,943 A | 12/1989 | Suzuki et al. | |
| 4,931,965 A | 6/1990 | Kaneko et al. | |
| 4,980,518 A | 12/1990 | Kobayashi et al. | |
| 5,070,325 A | 12/1991 | Tanaka et al. | |
| 5,097,102 A | 3/1992 | Yoshimura et al. | |
| 5,097,415 A | 3/1992 | Yoshimura et al. | |
| 5,142,106 A | 8/1992 | Yoshimura et al. | |
| 5,239,138 A | 8/1993 | Kobayashi et al. | |
| 5,500,492 A | 3/1996 | Kobayashi et al. | |
| 5,539,678 A | 7/1996 | Tanaka et al. | |
| 5,565,893 A | 10/1996 | Sato et al. | |
| 5,714,698 A | 2/1998 | Tokioka et al. | |

(Continued)

FOREIGN PATENT DOCUMENTS

| | | | |
|---|---|---|---|
| JP | 3964079 A | 8/2007 | |
| JP | 2007-265417 A | 10/2007 | |

OTHER PUBLICATIONS

U.S. Appl. No. 13/161,318, filed Jun. 15, 2011. Applicant: Kobayashi, et al.

*Primary Examiner* — John H Le

(74) *Attorney, Agent, or Firm* — Fitzpatrick, Cella, Harper & Scinto

(57) ABSTRACT

Position information of a first sensor unit and a second sensor unit is calculated using angle information of peaks calculated from a light amount distribution having a plurality of peaks detected by light-receiving unit of the second sensor unit from light emitted by light-emitting unit of the first sensor unit. The coordinates of a pointed position are calculated based on the position information of the first sensor unit and the second sensor unit and a change in a received light amount distribution that occurs due to a pointing to a coordinate input region detected by the light-receiving units. Here, the light-emitting units of the respective multiple sensor units are arranged in known positions relative to the light-receiving units.

20 Claims, 13 Drawing Sheets

(56) References Cited

U.S. PATENT DOCUMENTS

| | | |
|---|---|---|
| 5,726,686 A | 3/1998 | Taniishi et al. |
| 5,736,979 A | 4/1998 | Kobayashi et al. |
| 5,805,147 A | 9/1998 | Tokioka et al. |
| 5,818,429 A | 10/1998 | Tanaka et al. |
| 5,831,603 A | 11/1998 | Yoshimura et al. |
| 5,936,207 A | 8/1999 | Kobayashi et al. |
| 6,415,240 B1 | 7/2002 | Kobayashi et al. |
| 6,862,019 B2 | 3/2005 | Kobayashi et al. |
| 7,075,524 B2 | 7/2006 | Kobayashi et al. |
| 7,432,914 B2 * | 10/2008 | Kobayashi et al. ........... 345/173 |
| 7,486,281 B2 | 2/2009 | Kobayashi et al. |

\* cited by examiner

COORDINATE INPUT APPARATUS

BACKGROUND OF THE INVENTION

1. Field of the Invention

The present invention relates to coordinate input apparatuses that optically detect a coordinate location input on a coordinate input surface using a pointer, such as a finger, for inputting and selecting information. The present invention particularly relates to removable and portable coordinate input apparatuses.

2. Description of the Related Art

Thus far, various types of coordinate input apparatuses (such as touch panels, digitizers, and so on) have been proposed or commercialized as this type of coordinate input apparatus. For example, touch panels and the like, which allow a PC (personal computer) or the like to be operated with ease simply by touching a screen with a finger without using a special tool, have become widespread.

Various systems are used in such coordinate input apparatuses, such as panels that employ resistive films, panels that employ ultrasound waves, and so on. As a system that employs light, a retroreflecting member is provided on the outside of the coordinate input surface, light from a light-emitting unit is reflected by the retroreflecting member, and the distribution of that light amount is detected by a light-receiving unit, thereby detecting the direction of a light-shielding region in which the light has been shielded by a pointer such as a finger (a light-shielding object) within the coordinate input region. This optical light-shielding coordinate input apparatus, as it is known, then determines a light-shielding position, or in other words, the coordinates of a coordinate input position (see, for example, U.S. Pat. No. 4,507,557).

The configuration illustrated in FIG. 14 indicates a generalized example of the configuration disclosed in U.S. Pat. No. 4,507,557. FIG. 14 illustrates sensor units 901 arranged on both ends of a coordinate input surface, a coordinate input surface 902 used when inputting coordinates, and a retroreflecting member 903 that surrounds the coordinate input surface 902 on three sides and retroreflects light that has entered back in the direction in which the light entered.

The sensor units 901 include light-emitting units and light-receiving units (not shown). The light-emitting units irradiate light that expands in a fan shape almost parallel to the coordinate input surface 902, whereas the light-receiving units receive the light that returns recursively having been reflected by the retroreflecting member 903. The coordinate input apparatus is capable of calculating a position 904 of coordinates input into the coordinate input surface 902 based on shielding angles θL and θR of the respective light detected by the two sensor units 901 and the distance between the sensor units 901.

In such optical light-shielding coordinate input apparatuses, it is necessary, in order to calculate a precise coordinate input position, to arrange the sensor units 901, which include the light-receiving units, at predetermined positions. However, there is a limit, in terms of precision, as to how accurately the sensor units 901 can actually be arranged, and it is also thought that the positions may shift after attachment as well. A technique for carrying out what is known as calibration, or reference point setting in which inputs are carried out at a plurality of pre-set locations in the coordinate input region, has been disclosed as a method for correcting positional shift in the sensor units 901, as in, for example, Japanese Patent Laid-Open No. 2007-265417.

Meanwhile, Japanese Patent No. 3964079 discloses a technique in which sensor units are once arranged at pre-set positions and the light emitted from one of the sensor units is received by the other sensor unit, and shift in the sensor unit that receives the light is detected based thereupon.

However, in the aforementioned conventional related art, the method that carries out reference point setting requires additional operations in forcing a user to point of a plurality of points, and is thus problematic in terms of operability. Furthermore, the technique disclosed in Japanese Patent No. 3964079 is capable only of detecting shifts in the case where the two sensor units are first arranged in pre-set positions. In other words, the positions of the sensor units cannot be found in the case where a user has arranged those sensor units in any desired positions.

Meanwhile, coordinate input apparatuses can also be considered for use in office and educational settings, being used at destinations as large-screen electronic dry-erase boards themselves, or by being attached to existing blackboards or dry-erase boards, large-screen displays, and so on, in order to input coordinates. In other words, a user packs up and only transports a sensor unit portion and the units that belong thereto, and attaches the sensor units and the like to the flat plane for a predetermined usage region. Such a configuration is not only portable, but is also easy to attach and remove. However, in such a case, it is difficult for the user to arrange of the sensor units accurately, at a certain level of precision, around the coordinate input region. In other words, this configuration has a unique problem, which does not occur in a conventional type of apparatus in which the sensor units are arranged in a fixed manner in predetermined positions.

It is necessary, in a removable, portable, and compact coordinate input apparatus, to first obtain the coordinate information of the positions of the sensor units attached by the user at the desired positions.

The technique disclosed in Japanese Patent No. 3964079 assumes that the sensors are first arranged at known/pre-scribed distances and positions, and then detects differences from the initial state as correction amounts. Accordingly, the configuration cannot calculate positions and directional orientations in the case where the sensor units have been arranged in arbitrary positions. Meanwhile, with the technique disclosed in Japanese Patent Laid-Open No. 2007-265417, constituent elements, such as reference marks for the input region, are necessary in portions aside from the sensor units, which makes it necessary for the user to perform further additional operations.

SUMMARY OF THE INVENTION

The present invention provides a coordinate input apparatus, including a removable sensor unit, that is capable of automatically obtaining position information of the sensor unit that has been attached by the user in a desired position around a coordinate input region.

According to one aspect of the present invention, there is provided a coordinate input apparatus that calculates coordinates of a pointed position using sensor units configured of light-emitting units that emit light toward a coordinate input region and light-receiving units that detect a change in a received light amount distribution that occurs due to pointing to the coordinate input region, the apparatus comprising: a calculation unit adapted to calculate position information of a first sensor unit and a second sensor unit that is different from the first sensor unit, from among a plurality of sensor units that are arranged in arbitrary positions around the coordinate input region, using angle information of peaks detected from a light amount distribution having a plurality of peaks detected by the light-receiving unit of the second sensor unit from light emitted by the light-emitting unit of the first sensor unit; and an arithmetic unit adapted to compute the coordinates of the pointed position based on the position information of the first sensor unit and the second sensor unit and the change in the received light amount distribution that occurs due to the pointing to the coordinate input region detected by the light-receiving unit, wherein each of the light-emitting unit of the plurality of the sensor units are arranged in known positions relative to the light-receiving units.

According to the present invention, it is possible to obtain an advantageous effect in which, in a coordinate input apparatus that includes a removable sensor unit, position information of the sensor unit that has been attached by the user in a desired position around a coordinate input region can be automatically obtained. This makes it possible to detect input coordinates with high precision. Furthermore, this detection can be quickly performed without user operations such as the additional pointing of a plurality of marks.

Further features of the present invention will become apparent from the following description of exemplary embodiments with reference to the attached drawings.

DESCRIPTION OF THE EMBODIMENTS

Hereinafter, embodiments of the present invention will be described in detail using the drawings.

First Embodiment

The overall configuration of a coordinate input apparatus according to a first embodiment of the present invention will be described hereinafter using FIG. 1.

A numeral 4 indicates a coordinate input region that is, for example, rectangular in shape, used for pointing and inputting coordinates; this region is a region that is detected by sensor units 1A through 1D, which will be described later. This coordinate input region 4 is configured using a flat plate (not shown) that includes the coordinate input region 4.

1A through 1D indicate sensor units that include corresponding light-emitting units 6A through 6D and light-receiving units 7A through 7D, and are attached, by a user, at desired positions around the outside of the coordinate input region 4, near the four corners thereof.

If the flat plate that includes the coordinate input region 4 is configured of a member such as a steel plate, magnets, for example, may be used to hold the sensor units 1A through 1D when the sensor units are attached around the coordinate input region 4. However, the holding method is not limited thereto. Control/arithmetic units 2A and 2B, which carry out control of and calculations for the sensor units 1A through 1D, are connected to the respective sensor units at two locations, and the sensor units receive control signals from the control/arithmetic units 2A and 2B. The sensor units also transmit detected signals to the control/arithmetic units 2A and 2B.

Figure 1:
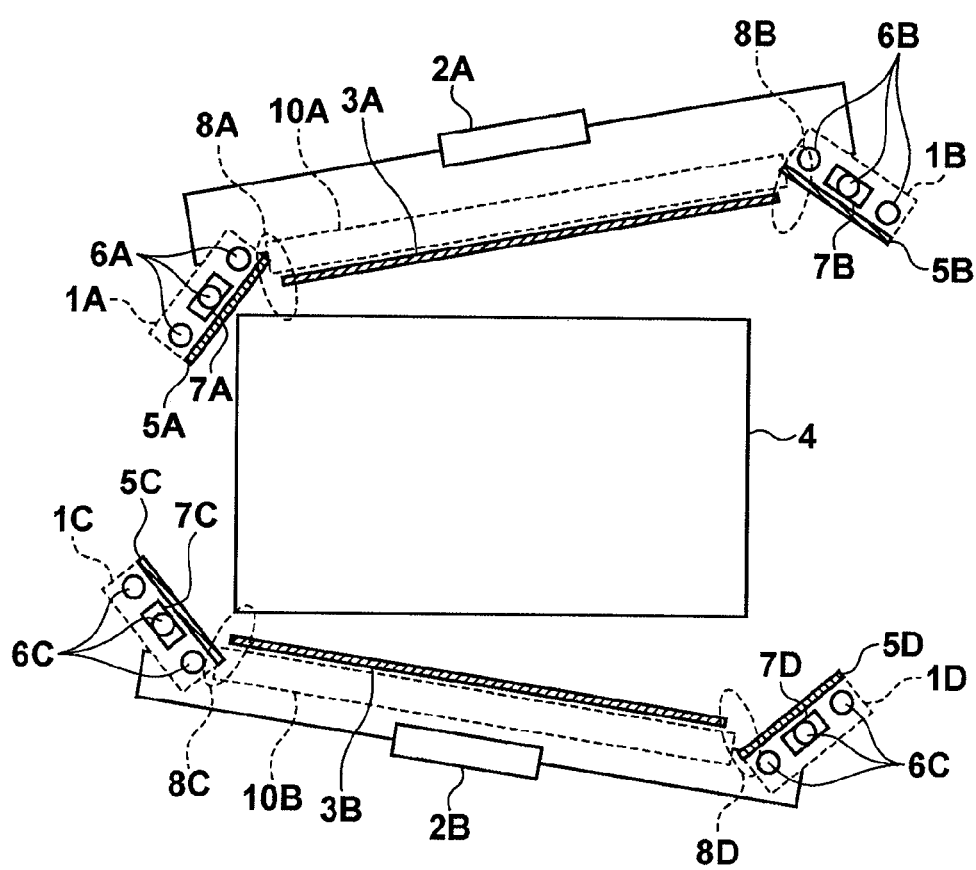
FIG. 1 is a diagram illustrating the overall configuration of the sensor unit in an attached state according to a first embodiment.
Figures 2A, 2B:
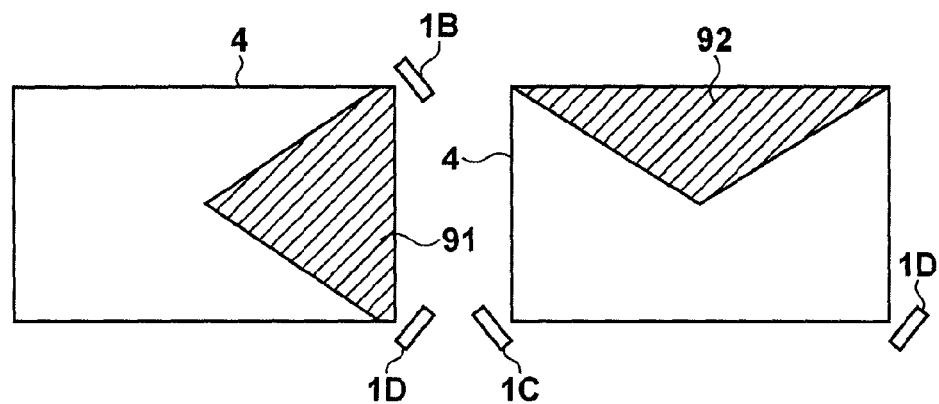
FIG. 2A is a descriptive diagram illustrating a region in which coordinates can be calculated according to the first embodiment.
FIG. 2B is a descriptive diagram illustrating a region in which coordinates can be calculated according to the first embodiment.
Figures 2C, 2D:
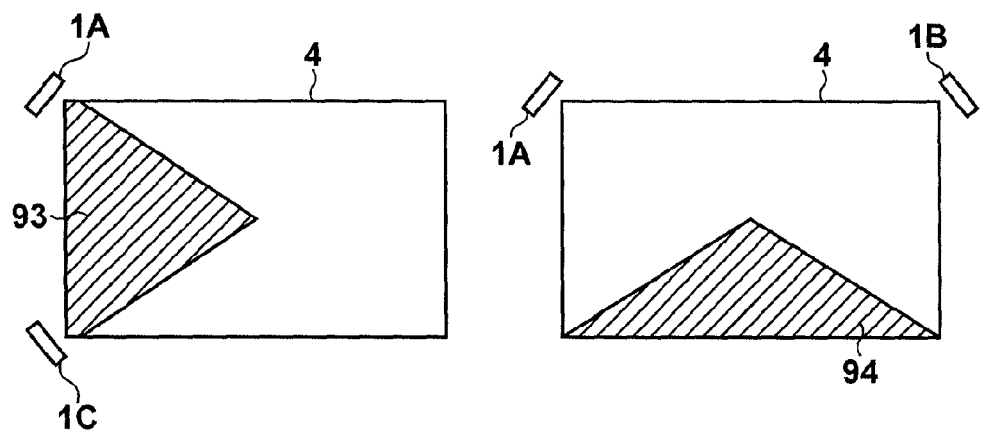
FIG. 2C is a descriptive diagram illustrating a region in which coordinates can be calculated according to the first embodiment.
FIG. 2D is a descriptive diagram illustrating a region in which coordinates can be calculated according to the first embodiment.

The light-emitting units 6A through 6D are, as shown in FIG. 1, provided three apiece for each of the sensor units 1A through 1D; the light-emitting units are provided vertically to the projection direction of light, and are arranged at even intervals in the direction parallel to the coordinate input region 4. The three light-emitting units for each of the sensor units 1A through 1D operate under a sensor unit position information obtainment mode (a first light-emitting mode), which will be described later; however, during a normal pointing coordinate detection mode (a second light-emitting mode), only the central light-emitting unit of the three light-emitting units operates. These two light-emitting modes will be described in detail later.

3A, 3B, and 5A through 5D indicate retroreflecting members, which have retroreflecting surfaces that reflect incident light in the direction from which the light came; the retroreflecting members retroreflect light projected from the sensor units 1A through 1D back toward those respective sensor units 1A through 1D. During the normal pointing coordinate detection mode, the reflected light is detected one-dimensionally by the light-receiving units 7A through 7D (each configured of a light collection optical system, a line CCD, and so on) of the sensor units 1A through 1D, and a light amount distribution thereof is sent to the control/arithmetic units 2A and 2B.

In the first embodiment, the retroreflecting members are configured on two opposing sides of the coordinate input region 4, and are thus divided into three retroreflecting members 3A, 5A, and 5B, and three retroreflecting members 3B, 5C, and 5D. eclipse dotted line regions 8A through 8D, which represent the division areas of the divided retroreflecting members, indicate portions that overlap, when viewed from the opposing sensor units 1A through 1D, so that gaps are not present in the retroreflecting surface, as shown in FIG. 1. In other words, the eclipse dotted line regions 8B and 8A overlap, when viewed from the sensor unit 1C or 1D, so that continuous retroreflected light can be obtained. The same applies to the eclipse dotted line regions 8D and 8C.

The retroreflecting members 3A and 3B are attached to sensor bar housings 10A and 10B, respectively, and the retroreflecting members 5A through 5D in the vicinities thereof are mounted in the sensor units 1A through 1D, respectively. During the normal pointing coordinate detection mode, the sensor units 1A and 1B receive light projected onto the retroreflecting members 3B, 5C, and 5D, which make up one of the two sides of the retroreflecting members. Likewise, the sensor units 1C and 1D receive light projected onto the retroreflecting members 3A, 5A, and 5B, which make up the other of the two sides of the retroreflecting members.

In this manner, the retroreflecting members are arranged on two opposing sides of a rectangle formed by the four sensor units 1A through 1D that are in turn arranged at desired positions at four corners on the outside of the coordinate input region, and are arranged at the positions of the sensor units 1A through 1D.

Note that in the following descriptions, the plurality of sensor units 1A through 1D are sometimes referred to collectively as sensor units 1, and in the same manner, the plurality of light-emitting units 6A through 6D and light-receiving units 7A through 7D are sometimes referred to as light-emitting units 6 and light-receiving units 7, respectively. Similarly, the retroreflecting members 3A and 3B and the retroreflecting members 5A through 5D are sometimes referred to as retroreflecting members 3 and retroreflecting members 5, respectively. Further still, the control/arithmetic units 2A and 2B are sometimes referred to as control/arithmetic units 2.

In the first embodiment, the sensor units 1A and 1B are linked and mounted to the sensor bar housing 10A, whereas the sensor units 1C and 1D are linked and mounted to the sensor bar housing 10B. However, in the case where the sensor units 1A through 1D and the sensor bar housings 10A and 10B are assembled integrally in advance, the positional relationships between the sensor units 1A and 1B and the sensor units 1C and 1D are values that are pre-set with high precision. In the case, however, where the sensor bar housings 10A and 10B are, for example, foldable or extendable due to the length of those sensor bar housings, the positional relationship between the sensor units 1A and 1B and the sensor units 1C and 1D is a general value that has a low precision, and there is a high possibility that the value is not known at all.

By configuring the coordinate input surface of which the coordinate input region 4 is configured as a display screen for a display apparatus such as a PDP, a rear projector, an LCD panel, or the like, or by projecting an image using a front projector, it is possible to use the coordinate input surface as an interactive input apparatus.

With such a configuration, when pointing has been made on the coordinate input region 4 using a pointer such as a finger, the light projected from the light-emitting units 6A through 6D is shielded, and the light reflected through the retroreflection can no longer be obtained; therefore, the light from only the pointing position cannot be obtained.

Each of the control/arithmetic units 2A and 2B includes a communication unit that communicates with the other control/arithmetic unit; the control/arithmetic units 2A and 2B detect a light-shielding range of the area at which the pointing was made based on a change in the light amount at the sensor units 1A through 1D, specify detection points within that light-shielding range, and calculate angles that correspond respectively thereto. Based on the calculated angles, as well as the calculated distance and positional relationships between the sensor units 1A through 1D, which will be mentioned later, a coordinate location in the coordinate input region 4 is calculated, and coordinate values are output to an information processing apparatus such as a PC or the like via a communication interface such as USB or the like.

Meanwhile, both the control/arithmetic units 2A and 2B includes storage units that store position information such as the distance, positional relationship, and so on between the sensor units 1A through 1D, which will be mentioned later, and it is thus possible for the control/arithmetic units 2A and 2B to exchange necessary position information with each other via the communication units provided in the respective control/arithmetic units.

It is therefore possible to perform operations on the information processing apparatus, such as drawing lines upon the display screen, manipulating icons, and so on, by using a pointer such as a finger.

FIGS. 2A through 2D indicate coordinate detection ranges of the coordinate input region 4 in which coordinates can be calculated by combinations of the sensor units 1A through 1D.

As shown in FIGS. 2A through 2D, regions in which the light projected from the sensor units 1A through 1D overlaps with the light-receiving ranges of the retroreflected light correspond to the ranges in which coordinates can be calculated. Accordingly, the range in which coordinates can be calculated by the sensor units 1B and 1D is a range 91, indicated by the diagonal lines in FIG. 2A. Likewise, the range in which coordinates can be calculated by the sensor units 1C and 1D is a range 92, indicated by the diagonal lines in FIG. 2B, whereas the range in which coordinates can be calculated by the sensor units 1A and 1C is a range 93, indicated by the diagonal lines in FIG. 2C. Finally, the range in which coordinates can be calculated by the sensor units 1A and 1B is a range 94, indicated by the diagonal lines in FIG. 2D.

The sensor units 1A through 1D are configured of the light-emitting units 6A through 6D and the light-receiving units 7A through 7D, respectively.

Figure 3A:
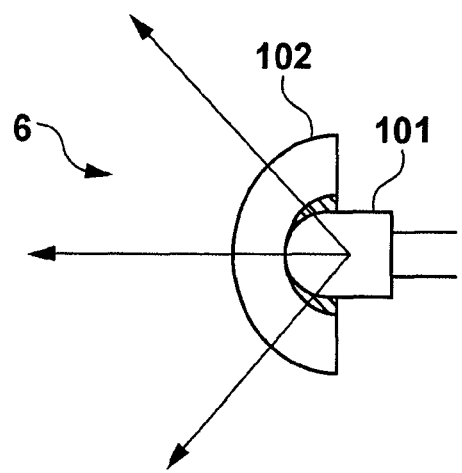
FIG. 3A is a diagram illustrating the configuration of a light-emitting unit in the sensor unit according to the first embodiment.

FIG. 3A illustrates one of the light-emitting units 6 of the sensor units 1. In FIG. 3A, 101 indicates an infrared LED that emits infrared light, and the light is projected across a predetermined range toward the retroreflecting members 3 and 5 by a projection lens 102. To go into more detail, the projection lens 102 that partially configures each of the light-emitting units 6 in the sensor units 1 is configured of a collimator lens, which projects the light approximately parallel to the surface of the coordinate input region 4 without the light rays spreading out in the vertical direction relative to the surface of the coordinate input region 4.

During the normal pointing coordinate detection mode, the infrared light projected by the light-emitting units 6 is retroreflected in the direction from which the light came by the retroreflecting members 3 and 5, and that reflected light is detected by the light-receiving units 7 in the sensor units 1A through 1D. In the case where the sensor units 1 are in the position information obtainment mode, the infrared light projected by the light-emitting units 6 is detected directly by the light-receiving units 7 in the opposing sensor units 1A through 1D.

Figure 3B:
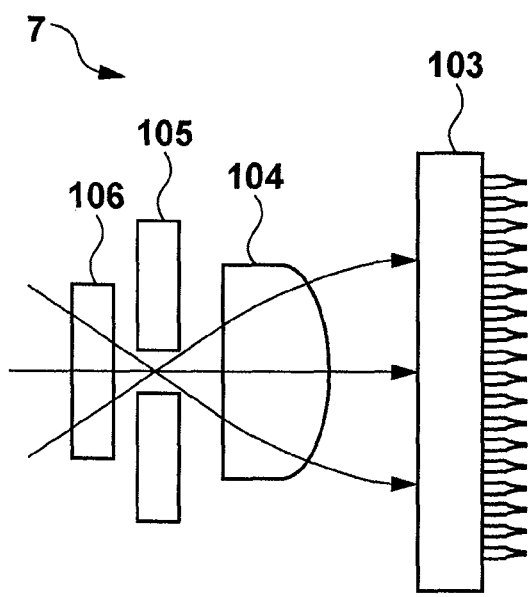
FIG. 3B is a diagram illustrating the configuration of a light-receiving unit in the sensor unit according to the first embodiment.

As shown in FIG. 3B, each light-receiving unit 7 is configured of: a line CCD 103, which is sensitive to light one-dimensionally, primarily in the infrared range; a light collection optical system light-receiving lens 104; an aperture 105 that generally restricts the direction of incident light; and an infrared filter 106 that prevents extraneous light, such as visible light (that is, ambient light) from entering. During the normal pointing coordinate detection mode, the light reflected by the retroreflecting members 3 and 5 passes through the infrared filter 106 and the aperture 105, and is then collected upon the detection element surface of the line CCD 103 by the light-receiving lens 104, thus forming an image. On the other hand, when the sensor units 1 are in the position information obtainment mode, the direct light passes through the infrared filter 106 and the aperture 105, and is then collected upon the detection element surface of the line CCD 103 by the light-receiving lens 104, thus forming an image.

Figure 4A:
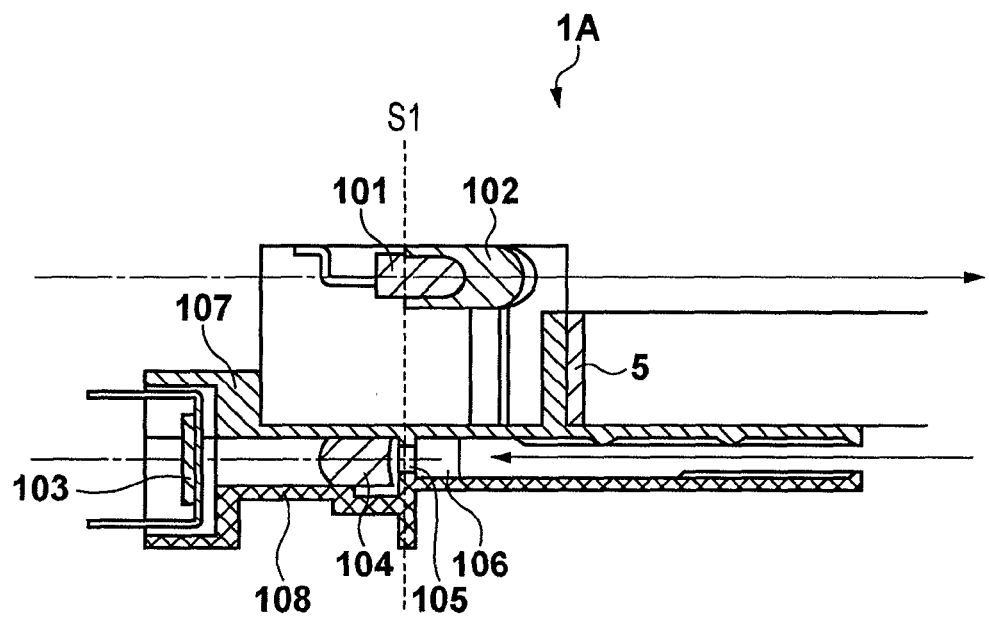
FIG. 4A is a diagram illustrating in detail the configuration of the sensor unit according to the first embodiment.
Figure 4B:
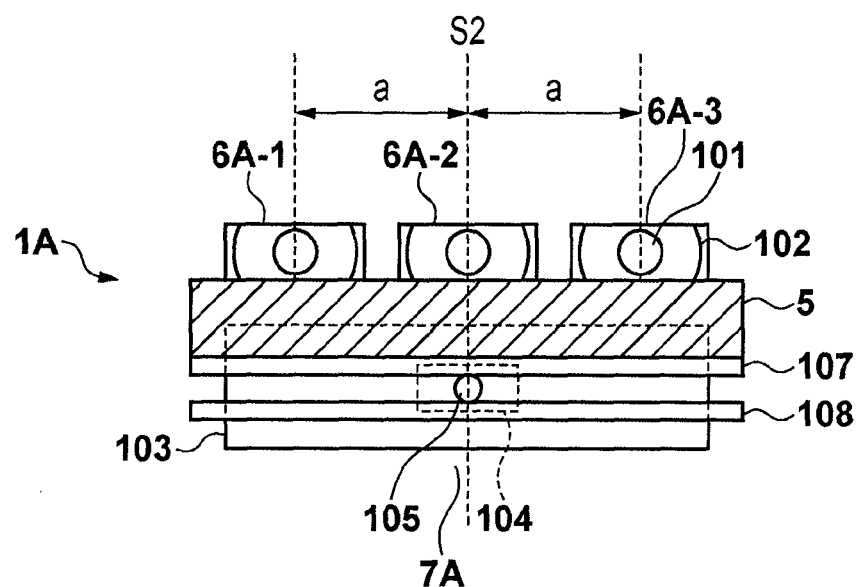
FIG. 4B is a diagram illustrating in detail the configuration of the sensor unit according to the first embodiment.

FIGS. 4A and 4B are diagrams that illustrate in detail the configuration of the sensor units 1, which are partially configured by the light-emitting units 6 and the light-receiving units 7, according to the first embodiment. FIG. 4A is a front view seen from the direction of the optical axis of the projected light of the sensor unit 1, whereas FIG. 4B is a cross-sectional view thereof.

Elements for which the reference numerals in FIG. 4A and FIG. 3 match indicate the same elements; aside from these, 107 indicates an upper hood member, whereas 108 indicates a lower hood member. The infrared filter 106 and the light-receiving lens 104 are positioned by the upper hood member 107 and the lower hood member 108; light beams enter through the gap that is formed by these hood members.

Here, in the first embodiment, the light-emitting units 6 and the light-receiving units 7 are configured so as to be arranged overlapping each other in the vertical direction of the coordinate input region 4, which serves as the coordinate input surface. The first retroreflecting member 5 is arranged between the light-emitting units 6 and the light-receiving units 7, and is attached to an upper portion of the upper hood member 107.

Although FIGS. 4A and 4B illustrate the configuration of the sensor unit 1A in FIG. 1, the sensor units 1B through 1D have the same configuration. As can be seen in FIG. 4B, light-emitting units 6A-1, 6A-2, and 6A-3 are arranged so as to be arranged in the vertical direction relative to the direction of the projected light, and are arranged at distances a, which are even intervals in the direction that is parallel to the coordinate input surface. The position of the infrared LED 101, serving as the light-emitting unit of the light-emitting unit 6A-2 arranged in the center, is in the same position, in a planar coordinate system that is parallel to the coordinate input region 4, as the position of the aperture 105, which serves as a reference position for a light-receiving unit 7A; this is indicated by an auxiliary line S1 in FIG. 4A and an auxiliary line S2 in FIG. 4B.

As a light-emitting mode used in the normal pointing coordinate detection mode, control is carried out so that only the light-emitting unit 6A-2 arranged in the center emits light, while the light-emitting units 6A-1 and 6A-3 arranged on either side thereof do not emit light. This control is carried out by the control/arithmetic unit 2A. The configuration is such that the light from the light-emitting unit 6A-2 is projected toward the retroreflecting members 3 and 5 by the projection lens 102 as a light beam that has been restricted so as to be approximately parallel to the coordinate input surface.

Meanwhile, the light projected from the light-emitting units 6 as a light beam approximately parallel to the coordinate input surface, and that has been projected at a predetermined angular direction along the surface direction, is retroreflected by the retroreflecting member 3 in the direction from which the light came. This light then passes through the infrared filter 106, the aperture 105, and the light-receiving lens 104, and is concentrated upon the detection element surface of the line CCD 103, thus forming an image.

A light amount distribution based on the incidence angle of the reflected light is output as the output signal from the line CCD 103, and thus the pixel numbers of the pixels that configure the line CCD 103 indicate angle information.

Note that the distance between the light-emitting units 6 and the light-receiving units 7 shown in FIGS. 4A and 4B is a value that is considerably lower than the distance from the light-emitting units 6 to the retroreflecting member 3, and thus the configuration is such that sufficient retroreflected light can be detected by the light-receiving units 7 even at a higher distance.

As described thus far, the sensor units 1A through 1D are configured so as to include the light-emitting units 6A through 6D, and the light-receiving units 7A through 7D that detect the light that has been projected from the light-emitting units 6A through 6D, respectively.

The foregoing descriptions have for the most part centered on the pointing coordinate detection mode; however, the following descriptions will center on the position information obtainment mode of the sensor unit 1.

In the case where the sensor units 1 are in the position information obtainment mode, light is emitted from the light-emitting units 6 of one of the opposing sensor units 1, and that light is received directly from the light-emitting units 6 by the light-receiving receiving units 7 in the other of the opposing sensor units 1.

For example, light that has been emitted by the light-emitting unit 6A in the sensor unit 1A (a first sensor unit) is detected by the light-receiving unit 7D in the sensor unit 1D (a second sensor unit), which is arranged as an opposing surface. The sensor unit in an opposing position as referred to here includes not only the sensor unit 1D that is arranged approximately at the opposing corner with the coordinate input region 4 therebetween, but also includes the sensor unit 1C and the sensor unit 1B, which are within the light-receiving range of the projected light from the light-emitting unit 6A of the sensor unit 1A.

The first embodiment describes a case in which the light-projection range of the sensor unit 1A is the light-receiving range of the sensor unit 1C and the sensor unit 1D. Although the following describes geometrical position calculation algorithms regarding the light received by the sensor unit 1D, the same applies to the sensor unit 1C. In addition, although not described in the first embodiment, the configuration may be such that the light-projection range of the light-emitting unit 6A in the sensor unit 1A is increased so that the sensor unit 1B can also receive the direct light from the sensor unit 1A. Furthermore, the following descriptions regarding the projected light of the sensor unit 1A also apply to the projected light of the sensor units 1B through 1D.

First, the light-emitting mode state in the case where the sensor units 1 are in the position information obtainment mode will be described.

In the case where light is projected from the light-emitting unit 6A of the sensor unit 1A, the light-receiving unit 7A of the sensor unit 1A itself is controlled so that a shutter or the like is closed and the light-receiving unit 7A cannot carry out detection, so that the retroreflected light from the light-emitting unit 6A is not detected. In addition, unlike the case where the retroreflected light is detected, when the light is directly received from the light-emitting unit 6A, it is necessary to carry out control so that the amount of projected light from the light-emitting unit 6A is sufficiently suppressed so as not to exceed the light-receiving saturation specifications of the line CCD 103 in the light-receiving unit 7D. Specifically, in the case where the sensor unit 1A is in the position information obtainment mode, the peak driving current, the current pulse-width, or both of the infrared LED 101 in the light-emitting unit 6A are controlled so as to suppress the amount of projected light. This control is carried out by the control/arithmetic unit 2A.

In the case where the sensor unit 1 is in the position information obtainment mode, the three light-emitting units 6A of the sensor unit 1A emit light simultaneously, with the light-emitting units 6A-1 and 6A-3 arranged on either side of the central light-emitting unit 6A-2 and arranged at the equal distances a emitting light in addition to the light-emitting unit 6A-2. This control is also carried out by the control/arithmetic unit 2A.

Figure 5:
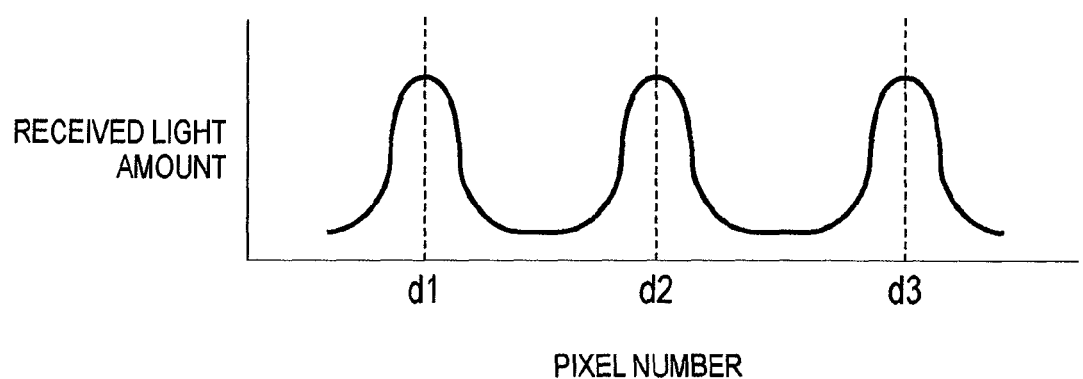
FIG. 5 is a diagram illustrating a received light amount distribution detected by a light-receiving unit of a sensor unit 1D when light has been emitted from a light-emitting unit of a sensor unit 1A according to the first embodiment.

FIG. 5 illustrates a light amount distribution of the light received by the line CCD 103 of the light-receiving unit 7D in the sensor unit 1D when light has been emitted from the light-emitting units 6A-1, 6A-2, and 6A-3 in the sensor unit 1A. A received light distribution that corresponds to the light emitted by the respective light-emitting units 6A-1, 6A-2, and 6A-3 is obtained, and through processing performed by the control/arithmetic units 2, respective peak pixels d1, d2, and d3 are detected. Furthermore, it is possible to calculate the angles between d1 and d2, and between d2 and d3, based on these peak pixels d1, d2, and d3.

Figure 6:
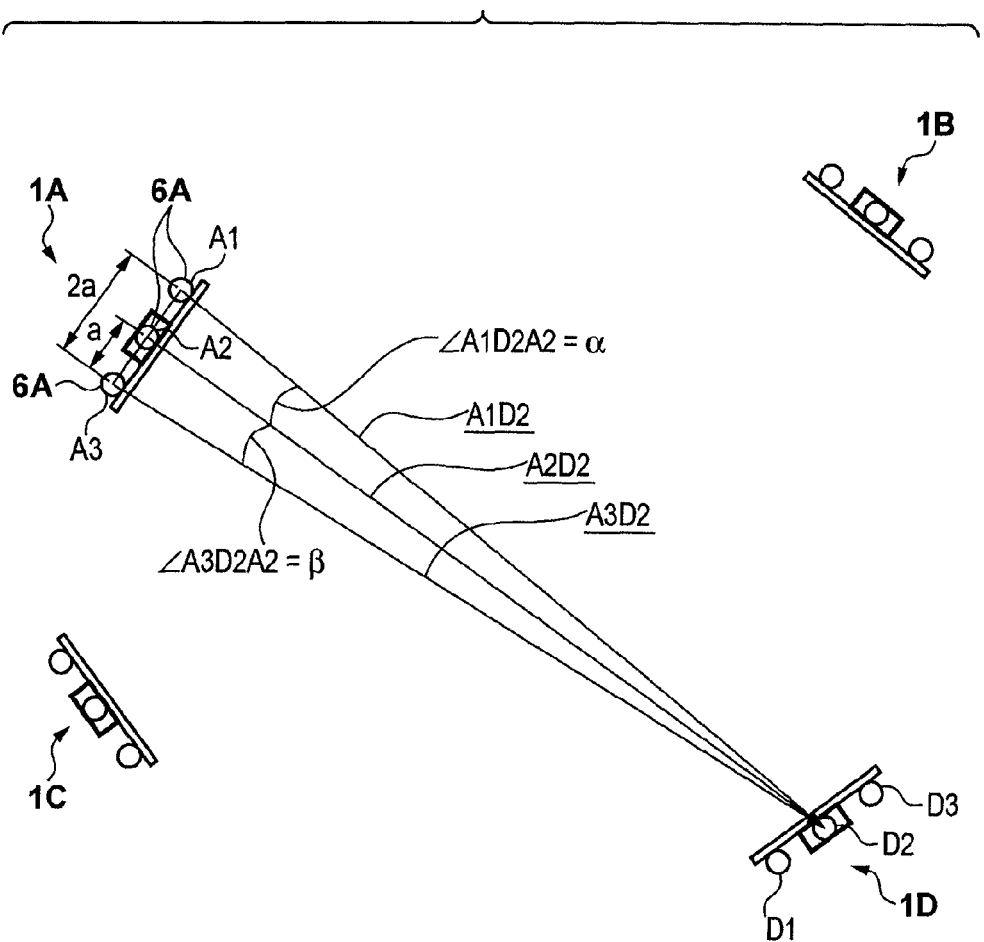
FIG. 6 is a diagram illustrating a positional relationship between light emitted and received between the sensor unit 1A and the sensor unit 1D according to the first embodiment.

FIG. 6 illustrates a simplified version of a positional relationship, in terms of the emitted light and the received light, between the sensor unit 1A and the sensor unit 1D. In FIG. 6, A1 through A3 indicate the positions where the light-emitting units 6A-1, 6A-2, and 6A-3, respectively, are arranged. The distance between A1 and A2 and the distance between A2 and A3 are a. Likewise, the position of the light-receiving unit 7D in the sensor unit 1D is indicated by D2. As described earlier, the light-emitting unit 6D-2 arranged in the center of the sensor unit 1D and the light-receiving unit 7D are in the same position. Of course, if the positional relationship between the light-emitting unit 6D-2 arranged in the center and the light-receiving unit 7D is already known, the two elements do not necessarily have to be in the same position, although this does complicate the calculations somewhat.

Next, a method for calculating the distance between the sensor unit 1A and the sensor unit 1D based on information obtained by receiving light directly between the sensor unit 1A and the sensor unit 1D will be described.

First, assume that the angles between d1 and d2, and between d2 and d3, which correspond to the peak pixels d1, d2, and d3 shown in FIG. 5, at the light-receiving unit 7D of the sensor unit 1D have been calculated. Here, assuming that these angles are expressed as $\angle A1D2A2=\alpha$ and $\phi A3D2A2=\beta$, the following relationship is established based on the geometric cosine law.

$$\cos\alpha = (A1D2^2+A2D2^2-A1A2^2)/2\cdot A1D2\cdot A2D2 \quad \text{(Formula (1))}$$

$$\cos\beta = (A3D2^2+A2D2^2-A1A3^2)/2\cdot A3D2\cdot A2D2 \quad \text{(Formula (2))}$$

In addition, based on the Pappas theorem of geometry, the following holds true:

$$A1D2^2+A3D2^2=2(A1A2^2+A2D2^2) \quad \text{(Formula 3)}$$

Here, as described earlier,

A1A2=A2A3=a (even interval at which light-emitting units are arranged)

and thus the distance between the sensor unit 1A and the sensor unit 1D, as well as A1D2, A2D2, and A3D2, are calculated based on Formulas 1 through 3 and the values $\alpha$ and $\beta$ measured at the light-receiving unit 7D of the sensor unit 1D. These arithmetic processes are carried out by the control/arithmetic units 2A and 2B. Here, the descriptions are given using a method in which the information A1D2, A2D2, and A3D2 related to the distance between the sensor units 1A and 1D are calculated as the information regarding the positional relationship between the sensor units 1A and 1D.

However, instead of this method, a coordinate system that includes the sensor units 1A through 1D may be set and the calculations may be carried out based thereupon. In other words, the positions of the light-emitting units 6A-1, 6A-2, and 6A-3 in the sensor unit 1A and the light-receiving unit 7D in the sensor unit 1D may be taken as $(X_{A1}, Y_{A1})$, $(X_{A2}, Y_{A2})$, $(X_{A3}, Y_{A3})$, and $(X_{D2}, Y_{D2})$, respectively, and the coordinates thereof calculated.

Figure 7:
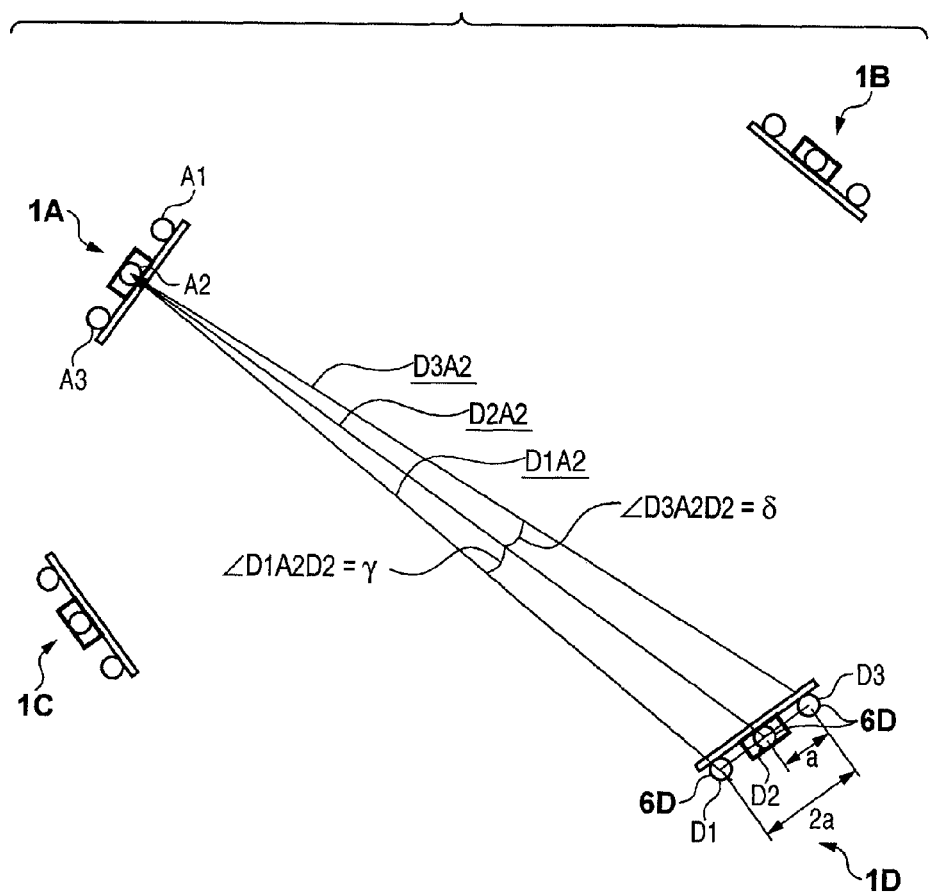
FIG. 7 is a diagram illustrating a positional relationship between light emitted and received between the sensor unit 1D and the sensor unit 1A according to the first embodiment.

The next time, the emission and reception of light between the sensor unit 1A and the sensor unit 1D are carried out in a manner opposite to the case shown in FIG. 6. In other words, the direct light emitted from the light-emitting units 6D-1, 6D-2, and 6D-3 in the sensor unit 1D is received by the light-receiving unit 7A in the sensor unit 1A. This is shown in FIG. 7. In FIG. 7, D1 through D3 indicate the positions at which the light-emitting units 6D-1, 6D-2, and 6D-3 in the sensor unit 1D are arranged. As with the sensor unit 1A, the distance between D1 and D2 and the distance between D2 and D3 are the same interval a. Likewise, the position of the light-receiving unit 7A in the sensor unit 1A is indicated by A2. The reason for this is that, as described earlier, the light-emitting unit 6A-2 arranged in the center of the sensor unit 1A and the light-receiving unit 7A are in the same position. Here, as with the case shown in FIG. 6, the angles between d1 and d2, and between d2 and d3, are calculated, using the peak pixels d1, d2, and d3 obtained at the light-receiving unit 7A of the sensor unit 1A, based on the direct light emitted from the sensor unit 1D and received by the light-receiving unit 7A in the sensor unit 1A. These angles are expressed as $\angle D1A2D2=\gamma$ and $\angle D3A2D2=\delta$.

Thereafter, in the same manner as with the sensor unit 1A, distances D2A2, D1A2, and D3A2 between the sensor unit 1D and the sensor unit 1A are calculated.

Thus the distances central to the sensor units, or A2D2 illustrated in FIG. 6 and D2A2 illustrated in FIG. 7, are calculated, and thus the precision of the calculated distances can be increased by employing the average value thereof.

Furthermore, as described earlier, the distances A1D2, A3D2, D1A2, and D3A2, from the center of the sensor units to the light sources a set distance a to either side thereof (that is, the light-emitting units 6A-1 and 6A-3), are calculated. Using this position information, and the known three sides of the triangle, the angles of slope relative to line segments that connect the centers of the sensor units are calculated.

Figure 8:
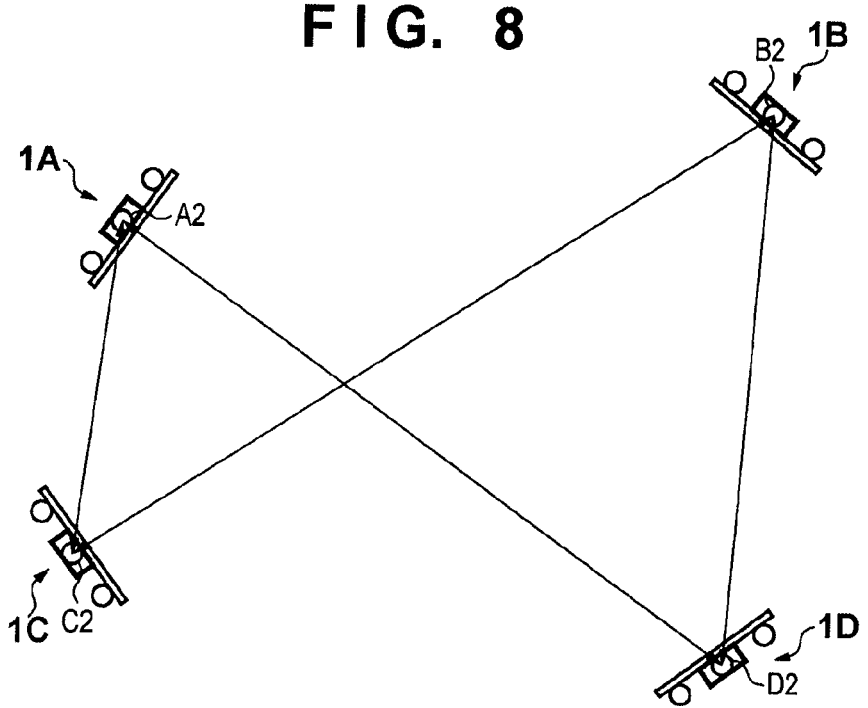
FIG. 8 is a descriptive diagram illustrating the calculation of a sensor unit position according to the first embodiment.

The same calculations of the distances between the light receiving/emitting center points of the sensor units as described above are carried out for the sensor units 1B and 1C, the sensor units 1A and 1C, and the sensor units 1B and 1D. Through this, first, as shown in FIG. 8, the distances between A2, B2, C2, and D2, which are the reference positions of the central points of the respective sensor units, are obtained in a cross-multiplication state, and the positional relationships between the respective sensor units are uniquely determined. Of course, if, as described earlier, the configuration is such that the angles of visibility of the sensor units are widened, light may be projected and received between the sensor units 1A and 1B and the sensor units 1C and 1D, and the distances between the respective central points of the light receiving/emission may be calculated. In such a case, the positional relationships between the respective sensor units can be calculated with even higher precision.

Figure 9:
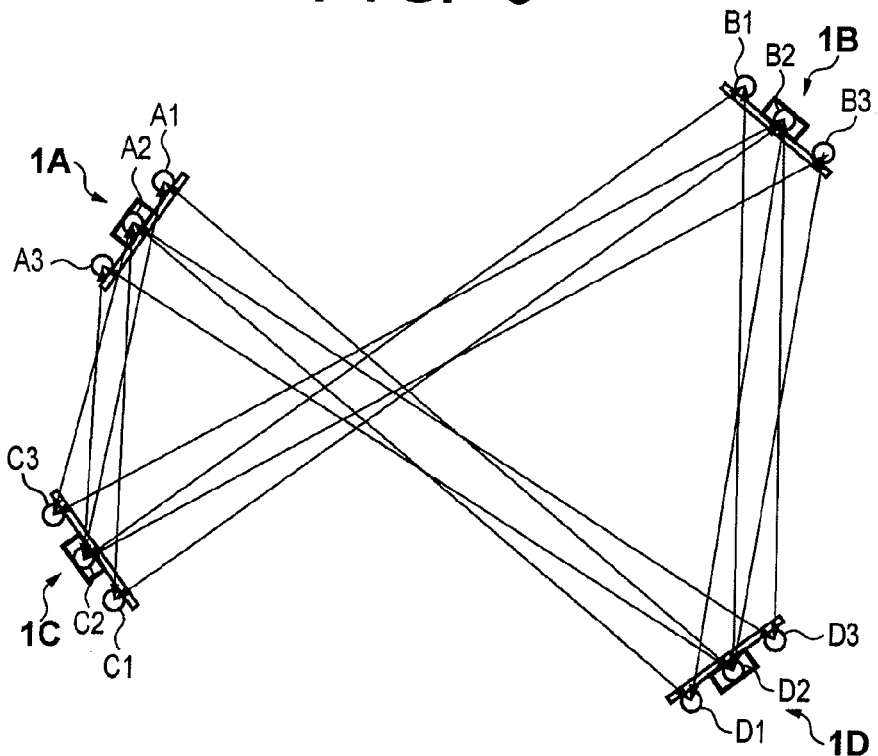
FIG. 9 is a descriptive diagram illustrating the calculation of a sensor unit position according to the first embodiment.

Furthermore, as shown in FIG. 9, the calculation of the distances between the center of the sensor units to the light sources a set distance a to either side thereof is carried out for the sensor units 1B and 1C, the sensor units 1A and 1C, and the sensor units 1B and 1D, in the same manner as with the sensor units 1A and 1D. The distances between the centers of the sensor units to the light sources a set distance to either side thereof are calculated based on this distance information, and thus the angles of slope relative to line segments that connect the centers of the sensor units are calculated.

The timing of the light emission by the sensor units 1A through 1D, and the corresponding light reception, is controlled so as to be shifted depending on the sets of sensor arrangement, in order to avoid a drop in the detection accuracy in peak pixels corresponding to the direct light resulting from the retroreflected light and the direct light intermixing. In other words, the set of the sensor units 1A and 1B mounted in the sensor bar housing 10A and the set of the sensor units 1C and 1D mounted in the sensor bar housing 10B perform light emission and the corresponding light reception in an alternating manner.

To rephrase, in the case of the combination of sensor units 1 and the sensor bar housings 10 shown in FIG. 1, the sensor units 1C and 1D do not emit light when the sensor units 1A and 1B emit light. With respect to the light-receiving units 7A and 7B of the sensor units 1A and 1B, respectively, control is carried out so that, as mentioned earlier, a shutter or the like is closed and the light-receiving units do not detect light, so that the retroreflected light is not detected. With respect to the light-receiving units 7A and 7B of the sensor units 1A and 1B, respectively, even if retroreflected light is received, a detection process for the peak pixels thereof need not be carried out.

The next time, the sensor units 1C and 1D emit light, and at that time, the sensor units 1A and 1B do not emit light. The processing that follows is the same and thus descriptions thereof will be omitted.

The subsequent calculations of the coordinates of pointing positions in the normal pointing coordinate detection mode are carried out based on the light emission/reception operations among the sensor units 1A through 1D when the sensor units 1 are in the position information obtainment mode, as well as the results of calculating the distances and angles of slope among the sensor units 1A through 1D based on the angle information of that light reception. A pointing position calculation algorithm used in a conventional technique is assumed to be used here as the algorithm for calculating the coordinates of the pointed position.

As described thus far, according to the first embodiment, the positions and slopes of the sensor units 1A through 1D, arranged by the user at desired positions, can be calculated without requiring any special user operations. Accordingly, even in a state in which the sensor units 1 are mounted on their respective sensor bar housings 10, it is possible to realize a compact product form, in which the sensor units are essentially independent parts that can be attached to the coordinate input surface.

In other words, because it is not necessary for the positional relationships between the sensor units 1 to depend on the precision with which the sensor bar housings 10 are attached, the freedom with which the sensor bar housings themselves can be provided with storage mechanisms such as folding mechanisms or the like can is increased. Even if the user mounts the sensor units 1 at previously-unknown desired positions without concern for restrictions such as distances between the sensors, the automatic sensor position detection according to the present invention that is carried out thereafter makes it possible to accurately detect pointed positions based on the obtained sensor position information, which in turn increases the usability for the user.

The first embodiment assumes an optical light-shielding system, and describes a configuration in which two sensor units 1 are linked by sensor bar housings 10. However, the first embodiment is not limited to this type of sensor bar housing. In other words, the configuration may be such that the sensor units 1 are in a completely physically independent form. In the case where the sensor units 1 are in an independent form, the retroreflecting member 3 unit may be arranged independently, as a retroreflecting member unit, between the sensor units 1A and 1B and the sensor units 1C and 1D.

This retroreflecting member unit maintains its retroreflecting properties for a certain degree of slopes as a result of the optical properties of the retroreflecting member 3. Accordingly, there is less demand for precision in the location at which the retroreflecting member 3 unit is installed than there is for the precision in the location at which the sensor units 1 are installed. Even in this case, according to the first embodiment, the positions of the sensor units 1 themselves can be calculated accurately, and it is thus possible to detect the subsequent pointed position coordinates based thereupon with high precision.

Although the first embodiment assumes the use of the light-shielding optical system, configuring the light-receiving units 7 of the sensor units 1 as, for example, cameras, enables a camera-system configuration in which the retroreflecting member 3 is not necessary. In the case of such a camera-system configuration, the features such as the compactness, the ease of storage, and so on resulting from the independent form of the sensor units 1 can be even further realized.

As described thus far, even in the case where the sensor units 1 themselves have been arranged by a user in desired positions, the positional relationships between the sensor units 1 can be found in an accurate manner, which makes it possible to realize highly-precise coordinate detection for a pointed position based on that state. With a conventional apparatus that assumes a configuration in which the sensor units are mounted accurately in pre-determined positions, arranging the sensor units with high precision has led to an increase in the size and the weight thereof; however, according to the present invention, it is possible to achieve an apparatus configuration in which the sensor units are implemented as independent units in the minimum amount of space. Accordingly, not only is it possible to improve the lightness and the portability of the apparatus, but it is also possible to improve the flexibility with respect to the size of the coordinate input region, which in turn increases the applicability of the apparatus.

Second Embodiment

The first embodiment describes a configuration in which a plurality of (that is, three or more) point light sources configured of the infrared LED 101 and the projection lens 102, as shown in FIG. 4, are employed as the light-emitting units 6 of the sensor units 1. Of course, the configuration that employs a plurality of light sources is, as described earlier, used for the position information obtainment mode of the sensor units. During the normal pointing coordinate detection mode, causing only the single light source arranged in the center to emit light makes it possible to achieve pointing coordinate detection. However, with this configuration, the light-emitting units and the light-receiving units are arranged with the retroreflecting member therebetween, which makes it necessary to provide a certain amount of thickness in the sensor units.

Accordingly, the second embodiment describes a configuration in which the configuration of the first embodiment, in which a plurality of light sources are employed (as point light emission), is also applied in the normal pointing coordinate detection mode, which makes the retroreflecting member unnecessary in the sensor units and makes it possible to achieve a thinner apparatus. In the second embodiment, the plane-shaped light-emitting unit illustrated in FIGS. 10A through 10C is employed.

Figure 10A:
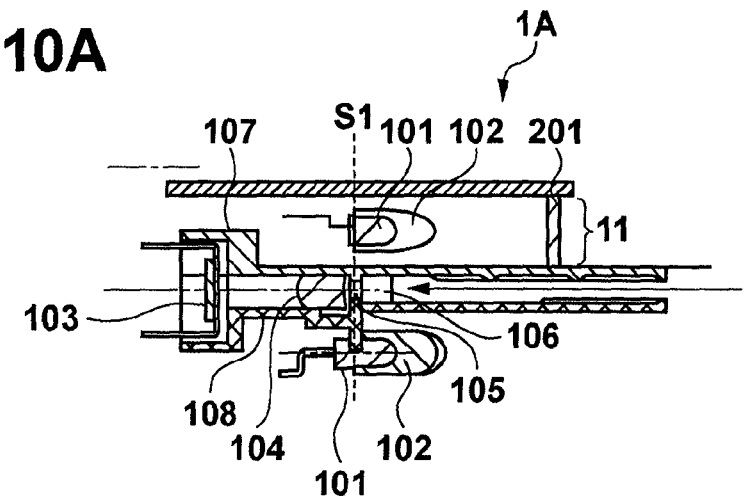
FIG. 10A is a diagram illustrating in detail the configuration of a sensor unit according to a second embodiment.
Figure 10B:
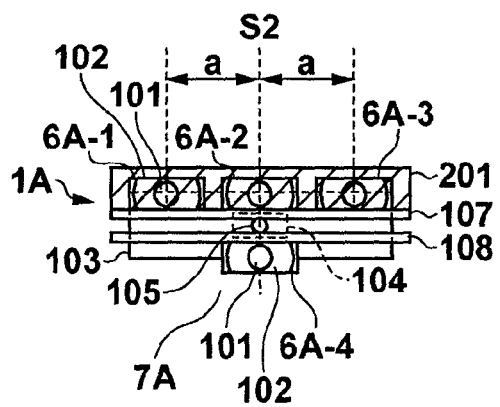
FIG. 10B is a diagram illustrating in detail the configuration of the sensor unit according to the second embodiment.
Figure 10C:
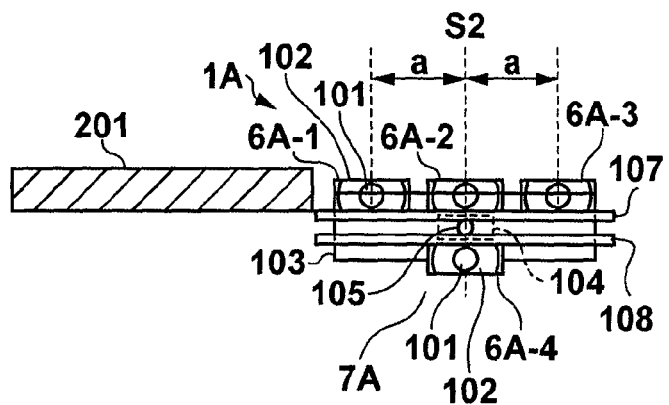
FIG. 10C is a diagram illustrating in detail the configuration of the sensor unit according to the second embodiment.

As shown in FIG. 10A, a planar light-emitting unit 11 is arranged in the position in which the retroreflecting member 5 is arranged in the first embodiment. This planar light-emitting unit 11 is configured of the infrared LED 101 and the projection lens 102 as in the first embodiment, as well as a diffuser plate 201 serving as a unit that diffuses light in the projection direction. As shown in FIG. 10B, the infrared LED 101 and the projection lens 102 of each planar light-emitting unit 11 are arranged, three apiece, at equal distances a in the vertical direction relative to the direction in which light is projected, serving as the light-emitting units 6A-1, 6A-2, and 6A-3. The position of the infrared LED 101 of the light-emitting unit 6A-2 arranged in the center is in the same position, in a planar coordinate system parallel to the coordinate input region 4, as the position of the aperture 105, which serves as the reference position of the light-receiving unit 7A, as indicated by S1 in FIG. 4A and S2 in FIG. 4B. This is identical to the first embodiment.

The diffuser plate 201 is arranged so as to cover the light-projection range, from the infrared LED 101 and the projection lens 102, in the horizontal direction relative to the coordinate input surface, or in other words, is arranged so as to have a width that is sufficient for preventing direct light from being emitted. Alternatively, the configuration may be such that a hood-shaped surrounding portion is provided, and a projected light opening is configured therein of only the diffuser plate 201. This diffuser plate 201 is set so as to haze the light rays so that the light rays from the infrared LED 101 and the projection lens 102 are sufficiently diffused and so that a sufficient amount of projected light can be obtained. At the same time, the diffuser plate 201 is arranged so that the contours of the light from the infrared LED 101 and the projection lens 102, which serve as a point-shaped light-emitting unit, are sufficiently unified in terms of the light amount distribution, and is arranged at a distance that enables the projected light from the diffuser plate 201 to be sufficiently equalized.

Figure 10D:
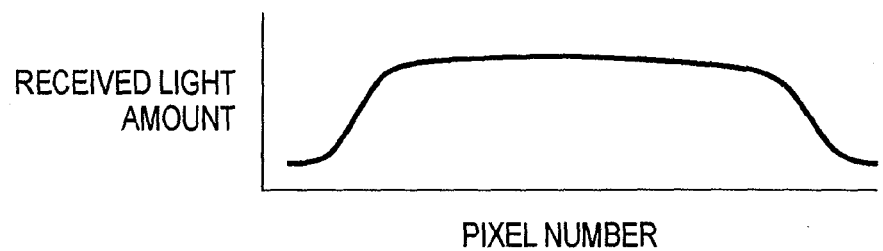
FIG. 10D is a diagram illustrating a distribution of light received by the sensor unit according to the second embodiment.

Each sensor unit 1 is thus configured so as to function as a planar light-emitting light source in which, in the diffuser surface of the diffuser plate 201, countless point-shaped light sources continue in the direction parallel to the coordinate input surface. In the case where the sensor unit 1 is configured so as to realize planar light emission in this manner by arranging the diffuser plate 201, the received light distribution of the light-receiving unit 7 in the opposing sensor unit 1 is, as shown in FIG. 10D, a continuously uniform distribution. Furthermore, because the light amount is dampened due to light scattering through the diffuser plate 201, it is necessary to change the amount of emitted light by that amount through mode switching; control for adjusting the driving currents of the infrared LEDs 101 is carried out by the control/arithmetic units 2.

Figure 11:
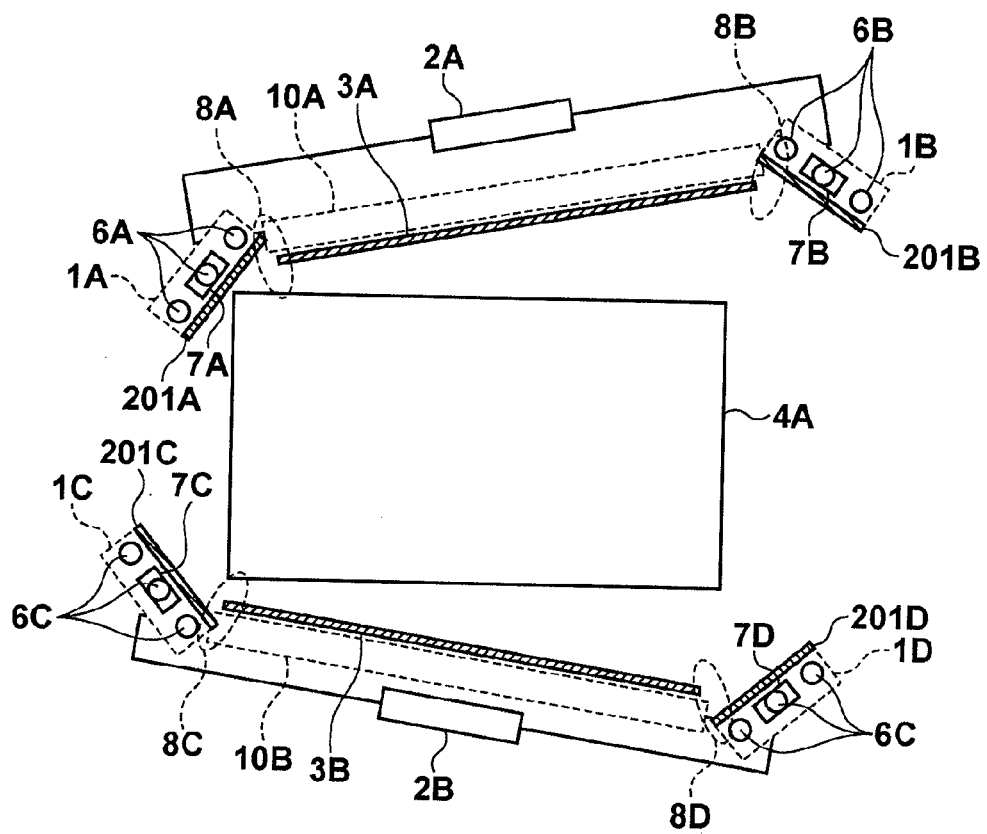
FIG. 11 is a diagram illustrating the overall configuration of the sensor unit in an attached state according to the second embodiment.

The projection range of the planar light-emitting unit 11 of a sensor unit that includes the diffuser plate 201 overlaps, as shown in FIG. 11 and as described in the first embodiment, with the light-receiving range of the sensor unit 1 that opposes the retroreflecting member 3, in the eclipse dotted line regions 8. In the sensor unit 1A according to the second embodiment and shown in FIGS. 10A and 10B, a light-emitting unit 6A-4, configured of the infrared LED 101 and the projection lens 102, is arranged toward the coordinate input surface in the dimensional direction of the coordinate input surface from the aperture 105. This configuration is employed so that the light that is emitted from the light-emitting unit 6A-4 and retroreflected by the retroreflecting member 3B shown in FIG. 11 is received by the light-receiving unit 7A only during the normal pointing coordinate detection mode. In other words, this constituent element aims to achieve the same effects as the conventional light-shielding system. The light-emitting unit that projects light toward the retroreflecting member 3A shown in FIG. 11 is the light-emitting unit 6D-4 (not shown) of the opposing sensor unit 1D. Like the light-emitting unit 6A-4, this light-emitting unit 6D-4 is arranged toward the coordinate input surface in the dimensional direction of the coordinate input surface from the aperture 105 of the sensor unit 1D. The light that has been retroreflected by the retroreflecting member 3A shown in FIG. 11 is received by the light-receiving unit 7D, which is the same as with the sensor unit 1A. The same applies to the sensor units 1B and 1C.

With the configuration of the sensor units according to the second embodiment, the diffuser plate 201 is removed from the projection path by being slid off or the like during the position information obtainment mode of the sensor unit, as shown in FIG. 10C, after which light is projected and received directly among the sensor units 1A through 1D, as in the first embodiment. However, the descriptions of the diffuser plate 201 as being slidable only illustrate a single example of a configuration in which the diffuser plate 201 is removed during the position information obtainment mode of the sensor unit, and it goes without saying that the diffuser plate 201, or furthermore, the diffusion effects themselves, may be controlled using another mechanism instead. Angular detection is then carried out based on the received light distribution shown in FIG. 10E, after which the sensor position and slope are calculated, as described earlier.

On the other hand, in the normal pointing coordinate detection mode, the diffuser plate 201 is slid or the like so as to enter into the projected light path, as shown in FIG. 10C, and the diffused light is emitted in a planar shape. In this pointing coordinate detection mode, the received light distribution is, in the range of the planar light-emitting unit 11 of the sensor unit 1, a planar light-emission distribution that continues in the surrounding direction, as shown in FIG. 10D, and is continuous, in terms of the light amount distribution, at the areas corresponding to the eclipse dotted line regions 8A through 8D shown in FIG. 11, thus connecting to the retroreflected light distribution of the retroreflecting member 3. With respect to the retroreflected light of the retroreflecting member 3, as described earlier, the light is projected by the light-emitting units 6A-4 through 6D-4, arranged toward the coordinate input surface in the dimensional direction of the coordinate input surface from the aperture 105 of the sensor unit 1.

The foregoing has described the sensor unit 1A, but the same applies to the sensor units 1B through 1D.

As described thus far, according to the second embodiment, the configuration is such that, in addition to the effects described in the first embodiment, some of the a plurality of light sources in the sensor unit carry out planar-shaped light emission so as to achieve the same function as the retroreflecting member. Through this, the light sources can function dually as both light sources and retroreflecting members, which makes it possible to effectively reduce the thickness of the sensor unit.

Third Embodiment

Figure 12:
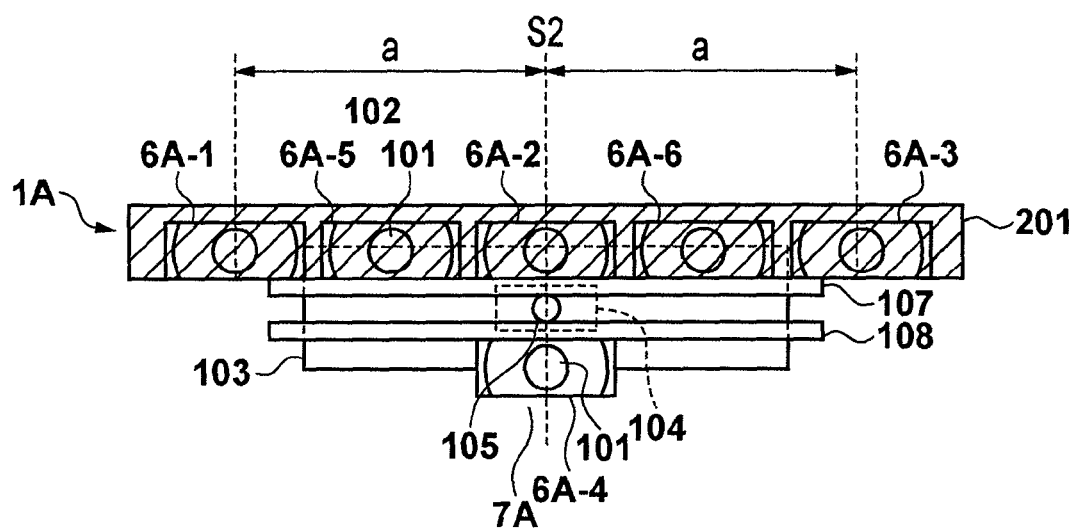
FIG. 12 is a diagram illustrating in detail the configuration of a sensor unit according to a third embodiment.

The second embodiment describes a configuration in which the diffuser plate 201 of the planar light-emitting unit 11 is removed in accordance with the light-emission mode, but the third embodiment describes a configuration in which the diffuser plate 201 is not removed, as shown in FIG. 12. In the present embodiment, light-emitting units 6A-5 and 6A-6 have been added between the light-emitting units 6A-1, 6A-2, and 6A-3 in the configuration of the sensor unit according to the second embodiment. The three light-emitting units 6A-1, 6A-2, and 6A-3 are arranged so as to be arranged in the vertical direction relative to the direction of the projected light, and are arranged at distances a, which are even intervals; this is the same as in the second embodiment. Furthermore, the positional relationship between the light-emitting unit 6A-2 and the light-receiving unit 7A is the same.

The diffuser plate 201 is arranged so as to cover the light-projection range of all of the light-emitting units 6A-1 through 6A-3 and 6A-5 to 6A-6, or in other words, is arranged having a width that is sufficient to prevent direct light from escaping. The degree of diffusion of the diffuser plate 201 is the same as in the second embodiment. During the normal pointing coordinate detection mode, all of the light-emitting units 6A-1 through 6A-3 and 6A-5 to 6A-6 are lit. This control is carried out by the control/arithmetic units 2. The positions of the light-emitting units 6A-1 through 6A-3 and 6A-5 to 6A-6, the degree of diffusion of the diffuser plate 201, and the distance between the light-emitting units 6 and the diffuser plate 201 are set so that, in the case where all of the light-emitting units 6A-1 through 6A-3 and 6A-5 to 6A-6 are lit, the received light distribution is a planar light-emission distribution that is continuous in the surrounding direction, as shown in FIG. 10D. The effects of the normal pointing coordinate detection mode thereafter are the same as those described in the second embodiment.

In the case where the sensor unit 1A is in the position information obtainment mode, the driving current of the infrared LEDs 101 is controlled so that, of the light-emitting units 6A-1 through 6A-3 and 6A-5 to 6A-6, the light-emitting units 6A-5 and 6A-6 are not lit, and only the light-emitting units 6A-1 through 6A-3 are lit. This control is also carried out by the control/arithmetic units 2. At this time, there is a greater interval between the light-emitting units 6A-1 through 6A-3 than there is in the case where all of the light-emitting units 6A-1 through 6A-3 and 6A-5 to 6A-6 are lit, which appears as a drop in the projected light amount to the side directions of the optical axis of the light-emitting units 6.

Figure 10E:
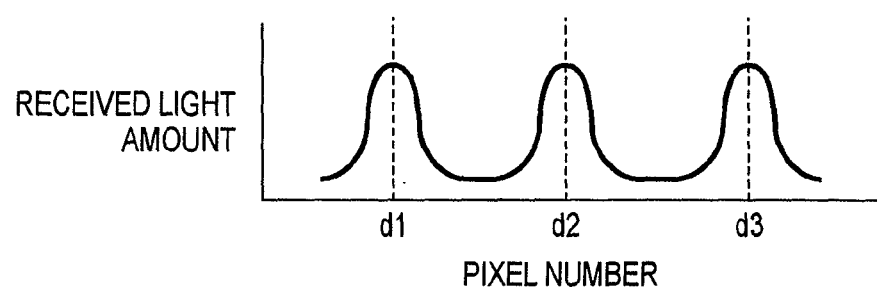
FIG. 10E is a diagram illustrating a distribution of light received by the sensor unit according to the second embodiment.

Accordingly, the interval of pixel numbers in the horizontal axis increases in the received light amount distribution in the light-receiving unit 7 that receives this projected light; however, in terms of the light amount distribution, peaks do appear, as shown in the aforementioned FIG. 10E. The algorithms for detecting the angles that corresponds to these peaks in the received light amount distribution from those peaks and for calculating the position detection information for the sensor units 1 are the same as those described in the second embodiment.

As described thus far, according to the third embodiment, it is possible to cause a change in the projected light distribution from the planar light-emitting unit 11 between the position information obtainment mode and the normal pointing coordinate detection mode of the sensor unit using only electrical control, without employing a special physical detachable mechanism for the diffuser plate 201. Accordingly, in the case where removable sensor units have been arranged by the user at desired positions, it is possible to quickly calculate the positions of the sensor units and then continue on to carry out the normal pointing position coordinate detection.

Although the third embodiment describes a configuration in which five light-emitting units 6 are arranged in each of the sensor units 1A through 1D, it should be noted that the number of light-emitting units 6 is not limited thereto; the configuration may include more light-emitting units 6, and controlling those light-emitting units to be lit or unlit depending on the light-emission mode may then be carried out.

Fourth Embodiment

The aforementioned embodiments describe the meanings and effects of the constituent elements of the present invention, with respect to the respective light-emitting mode states, or the position information obtainment mode and the normal pointing coordinate detection mode of the sensor units 1. Switching the light-emission modes may be carried out by providing a mode switching selection unit in the sensor unit 1, with the mode then being switched by the user as necessary, or an automatic mode switching unit may be provided in order to automatically switch the mode depending on the circumstances.

Alternatively, settings may be made in advance so that the sensor units 1 enter the position information obtainment mode when the power is turned on after the sensor units 1 have been attached to a flat surface that corresponds to the coordinate input region 4. At this time, the mode may automatically switch to the normal pointing coordinate detection mode when the position information of the sensor units 1 has been obtained, or a configuration that communicates this switch may be provided.

The aforementioned embodiments have described a configuration in which it is necessary for the light-emitting units 6 within the sensor units 1 to be arranged in known positions relative to the light-receiving unit 7, as a condition for making it possible to obtain the position information of the sensor units 1. At the same time, in order to carry out a more highly-precise coordinate detection during normal pointing coordinate detection, it is necessary for the positions of at least one of the light-emitting units and the light-receiving units in the sensor units 1 to match upon a planar coordinate system.

Accordingly, if the positions of at least one of the light-emitting units and the light-receiving units in the sensor units 1 match upon a planar coordinate system, the configuration conditions for the sensor unit needed to obtain the position information of the sensor units 1 are met. In other words, employing a configuration in which the positions of at least one of the light-emitting units and the light-receiving units in the sensor units 1 match upon a planar coordinate system makes it possible to realize sufficient functionality in either of the light-emission modes, or the position information obtainment mode and the normal pointing coordinate detection mode of the sensor units 1.

That coordinate pointing is not being carried out is a condition for avoiding erroneous detection when obtaining the position information of the sensor units 1. Accordingly, a display unit that carries out a warning display instructing the user not to point coordinates when the sensor units 1 are in the position information obtainment mode may be provided. Furthermore, a situation in which the positions at which the sensor units 1 have been mounted shift after a certain amount of use due to some sort of irresistible force can be considered as well. However, problems caused by such shifting of the sensor units can be solved in such a case as well simply by once again obtaining the position information of the sensor units 1 according to the present invention. Accordingly, the configuration may be such that a detection unit that detects when coordinate pointing has not been carried out for a set amount of time is provided, and the sensor units 1 are automatically switched to the position information obtainment mode in the case where it has been detected that coordinate pointing has not been carried out for the set amount of time.

As described thus far, according to the fourth embodiment, it is possible to quickly correct shifts in the sensor positions after the sensors have been mounted.

Fifth Embodiment

The aforementioned embodiments describe configurations in which a plurality of light-emitting units are arranged as the configurations for obtaining the position information of the sensor units 1. However, as a fifth embodiment, the configuration may be such that only a single light-emitting unit 6 is provided, whereas a plurality of (that is, two or more) light-receiving units 7 are provided. This configuration is shown in a simplified manner in FIG. 13, in the same manner as FIG. 6. The basic premise is the same as that described in the first embodiment and shown in FIG. 6, where the projected light side and the received light side differ. However, in the case where a plurality of light-receiving units are provided, it is sufficient to provide no less than two light-receiving units 7 in each of the sensor units 1A through 1D. This depends on the following geometrical theories.

Figure 13:
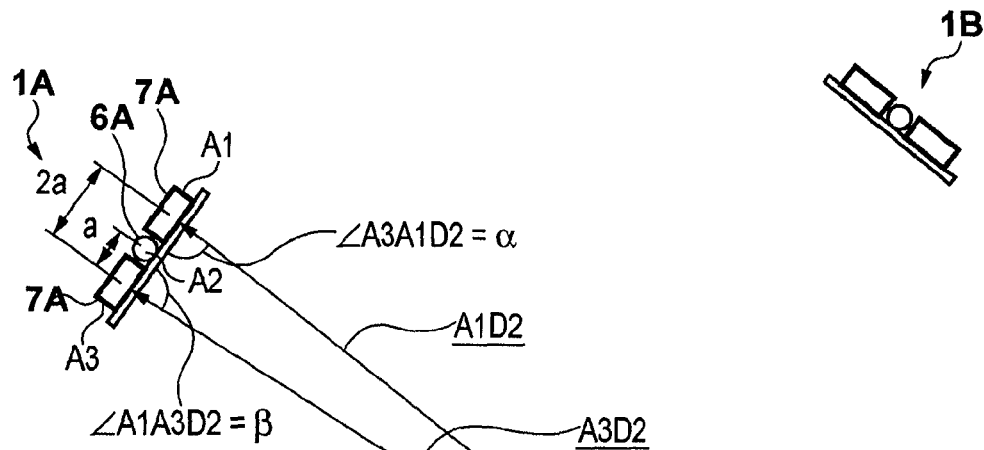
FIG. 13 is a descriptive diagram illustrating the calculation of a sensor unit position according to a fifth embodiment.
Figure 14:
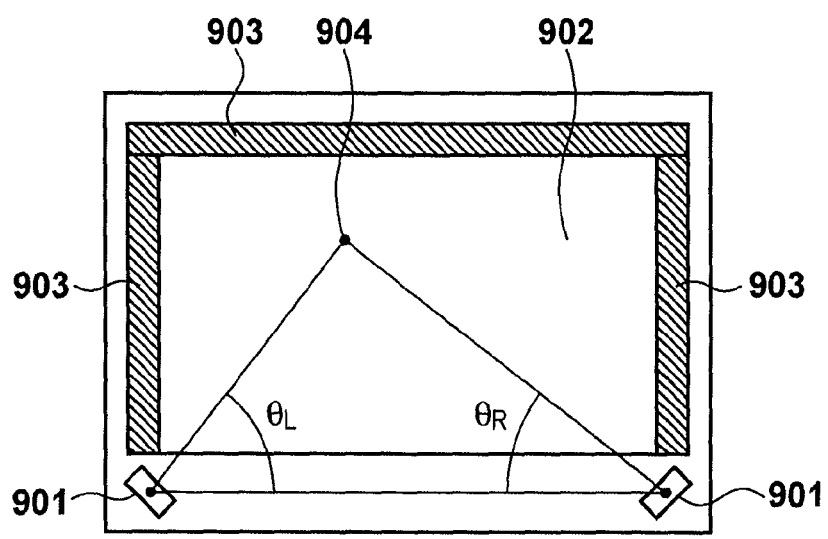
FIG. 14 is a diagram illustrating an example of a conventional optical light-shielding coordinate input apparatus.

Of course, it is necessary for the positional relationships between these light-receiving units 7 and the light-emitting units 6 to be known in advance, but it is further desirable, in that the calculation formulas are simplified as a result, for the light-emitting units 6 to be arranged central to the two light-receiving units 7 on a plane. Here, as shown in FIG. 13, the light-receiving units 7A are arranged at a distance $2a$ in the sensor unit 1A, and the positions thereof are taken as A1 and A3, respectively. Furthermore, the light-emitting unit 6A is arranged in a central position between the two light-receiving units 7A, and the position of the light-emitting unit 6A is taken as A2. Furthermore, the sensor unit 1D that opposes the sensor unit 1A on the light projection side is configured with the same positional relationship, and the position of the corresponding light-emitting unit 6D is taken as D2.

Although not shown here, when light is projected from the light-emitting unit 6D of the sensor unit 1D, the peak pixels are detected in the received light distribution detected by the two light-receiving units 7A in the sensor unit 1A that opposes the sensor unit 1D. The following angles are then calculated based thereupon. The angles calculated from the respective received light distribution of the light-receiving units 7A arranged in the positions A1 and A3 are $\angle A3A1D2=\alpha$ and $\angle A1A3D2=\beta$. The following relationship is established based on geometric principles.

Based on the sin rule, $$A1D2/\sin\beta = A3D2/\sin\alpha = 2a/\sin(\pi-\alpha-\beta)$$

By solving the above relational expression using the actually measured values of $\alpha$ and $\beta$ and the already-known a, A1D2 and A3D2 are calculated, and furthermore, the distance A2D2 between the sensor units 1A and 1D are calculated from those two values and the already-known values.

Furthermore, as in the first embodiment, with respect to the light emission and reception between the sensor unit 1A and the sensor unit 1D, light is emitted from the light-emitting unit 6A-2 at the position A2 in the sensor unit 1A and is detected by the two light-receiving units 7 in the sensor unit 1D the next time, which is the opposite of what is shown in FIG. 13. As in FIG. 13, the distance between the sensor units 1A and 1D is calculated, and by averaging the plurality of values obtained thereby, the precision of the distance between the sensor units 1A and 1D is increased.

The principle in which the same is carried out for the sensor units 1B and 1C, the sensor units 1A and 1C, and the sensor units 1B and 1D, obtaining the distances between the respective sensor units in a cross-multiplication state, and furthermore calculating the slopes, is the same as in the first embodiment.

The configuration in which two light-receiving units 7 are provided in the sensor units 1 requires that a light-emitting unit 6 for detecting pointed coordinates is provided directly above the two light-receiving units 7 (not shown), but this can be combined with the configuration of a compound-lens sensor unit according to related art in order to realize the simultaneous input of a plurality of coordinates. Furthermore, by combining the configuration of a compound-lens sensor unit with the calculation algorithms of the fifth and first embodiments makes it possible to improve the precision of the distance by continually obtaining multiple calculation values in each inter-sensor unit distance calculation and finding the average thereof.

As described thus far, according to the fifth embodiment, the same effects as those in the first embodiment can be obtained even in the case where the relationship between the numbers of the light-emitting units and the light-receiving units is opposite to that in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-204865, filed Sep. 13, 2010, which is hereby incorporated by reference herein in its entirety.

What is claimed is:

1. A coordinate input apparatus that calculates coordinates of a pointed position using four sensor units placed around a coordinate input region and constructed to emit light toward the coordinate input region and to receive light of the coordinate input region, the apparatus comprising:

an input unit constructed to input signals according to the received light; and a calculation unit constructed to calculate placement information of the four sensor units, using angle information of light received by the four sensor units, wherein the calculation unit is constructed to calculate the coordinates of the pointed position based on the placement information of the four sensor units and the light received by the four sensor units when the position in the coordinate input region is pointed.

2. The coordinate input apparatus according to claim 1, wherein three or more of the light-emitting units are arranged in each of the four sensor units; and the calculation unit calculates the placement information of the four sensor units using angle information of the light received by the four sensor units, each of the four sensor units receives light emitted from the three or more light-emitting units in the sensor units other than the sensor unit which receives the light.

3. The coordinate input apparatus according to claim 2, wherein the three or more of the light-emitting units are arranged in each of the four sensor units at even internals in a direction vertical to the emitted light and in parallel to the coordinated input region.

4. The coordinate input apparatus according to claim 1, wherein two or more light-receiving units are arranged in each of the four sensor units; and the calculation unit calculates the placement information of the four sensor units using angle information of light received by the two or more light-receiving units in each of the four sensor units based on the light emitted from the sensor units other than the sensor unit in which the two or more light-receiving units receiving the light are arranged.

5. The coordinate input apparatus according to claim 1, wherein each of the four sensor units comprises a light-emitting unit and a light-receiving unit positioned at a corresponding position on a planar coordinate system; and the apparatus operates a first light-emitting mode for calculating the placement information of the four sensor units and a second light-emitting mode for calculating the coordinates of the pointed position in the coordinate input region.

6. The coordinate input apparatus according to claim 5, wherein each of the four sensor units comprises a diffusing unit that diffuses light emitted by a plurality of light-emitting units of the four sensor units;

the apparatus further comprises a switching unit constructed to switch the light-emitting unit between point light emission for calculating the placement information of the four sensor units and planar light emission for calculating the coordinates of the pointed position in the coordinate input region.

7. The coordinate input apparatus according to claim 5, further comprising:

a detection unit constructed to detect that no pointing has been made in the coordinate input region for a set amount of time; and a switching unit constructed to switch from the second light-emitting mode to the first light-emitting mode when the detection unit has detected that no pointing has been made for the set amount of time, wherein in the first light-emitting mode following the switch performed by the switching unit, the calculation unit is constructed to calculate placement information of the four sensor units.

8. The coordinate input apparatus according to claim 1, wherein retroreflecting members are provided for each of two groups of opposing sides in a quadrangle formed by the four sensor units at four corners around the coordinate input region and the four sensor units, and the calculation unit is constructed to calculate the coordinates of the pointed position based on the light retroreflected from the retroreflecting members when the position in the coordinate input region is pointed.

9. The coordinate input apparatus according to claim 1, wherein the calculation unit is constructed to calculate the placement information of the four sensor units using the angle information of peaks in a received light amount distribution detected by each of the four sensor units.

10. The coordinate input apparatus according to claim 1, wherein the calculation unit is constructed to calculate the coordinates of the pointed position based on the placement information of the four sensor units and a change in a received light amount distribution when the position in the coordinate input region is pointed.

11. The coordinate input apparatus according to claim 1, wherein each of the four sensor units comprises a light emitting unit and a light-receiving unit, and the calculation unit is constructed to calculate the placement information of the four sensor units using the angle information and placement of the light emitting unit and light-receiving unit in each of the sensor units.

12. A coordinate input apparatus that calculates coordinates of a pointed position, comprising:

four sensor units placed around a coordinate input region and constructed to emit light toward the coordinate input region and to receive light of the coordinate input region; and a calculation unit constructed to calculate placement information of the four sensor units using angle information of light received by the four sensor units, wherein the calculation unit is constructed to calculate the coordinates of the pointed position based on the placement information of the four sensor units and the light received by the four sensor units when the position in the coordinate input region is pointed.

13. The coordinate input apparatus according to claim 12, wherein three or more of light-emitting units are arranged in each of the four sensor units; and the calculation unit calculates the placement information of the four sensor units using angle information of the light received by the four sensor units, each of the four sensor units receives light emitted from the three or more light-emitting units in the sensor units other than the sensor unit which receives the light.

14. The coordinate input apparatus according to claim 12, wherein each of the four sensor units comprises a light-emitting unit and a light-receiving unit positioned at a corresponding position on a planar coordinate system; and the apparatus operates in a first light-emitting mode for calculating the placement information of the four sensor units and a second light-emitting mode for calculating the coordinates of the pointed position in the coordinate input region.

15. The coordinate input apparatus according to claim 12, wherein retroreflecting members are provided for each of two groups of opposing sides in a quadrangle formed by the four sensor units at four corners around the coordinate input region and for the four sensor units, and the calculation unit is constructed to calculate the coordinates of the pointed position based on the light retroreflected from the retroreflecting members when the position in the coordinate input region is pointed.

16. The coordinate input apparatus according to claim 12, wherein each of the four sensor units comprises a diffusing unit that diffuses light emitted by a plurality of light-emitting units of each of the four sensor units; and the apparatus further comprises a switching unit constructed to switch the light-emitting unit between point light emission for calculating the placement information of the four sensor units and planar light emission for calculating the coordinates of the pointed position in the coordinated input region.

17. A method for calculating coordinates of a pointed position using four sensor units placed around a coordinate input region and constructed to emit light toward the coordinate input region and to receive light of the coordinate input region, the method comprising:

calculating placement information of the four sensor units using angle information of light received by the four sensor units; and calculating the coordinates of the pointed position based on the placement information of the four sensor units and the light received by the four sensor units when the position in the coordinate input region is pointed.

18. The method according to claim 17, wherein three or more of light-emitting units are arranged in each of the four sensor units; and the placement information of the four sensor units is calculated using angle information of the light received by the four sensor units, each of the four sensor units receives light emitted from the three or more light-emitting units in the sensor units other than the sensor unit which receives the light.

19. The method according to claim 17, wherein each of the four sensor units comprises a light-emitting unit and a light-receiving unit positioned at a corresponding position on a planar coordinate system; and the method is operated in a first light-emitting mode for calculating the placement information of the four sensor units and a second light-emitting mode for calculating the coordinates of the pointed position in the coordinate input region.

20. The method according to claim 17, wherein retroreflecting members are provided for each of two groups of opposing sides in a quadrangle formed by the four sensor units at four corners around the coordinate input region and for the four sensor units, and the coordinates of the pointed position are calculated based on the light retroreflected from the retroreflecting members when the position in the coordinate input region is pointed.

\* \* \* \* \*